US012781819B2

(12) United States Patent
Kukreja et al.

(10) Patent No.: US 12,781,819 B2
(45) Date of Patent: Nov. 3, 2026

(54) LIGHTWEIGHT MAGNESIUM-BASED COMPOSITE BRAKE ROTOR

(71) Applicant: GM GLOBAL TECHNOLOGY OPERATIONS LLC, Detroit, MI (US)

(72) Inventors: Ratandeep S. Kukreja, Auburn Hills, MI (US); Zhongyi Liu, Troy, MI (US); Heewook Lee, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 386 days.

(21) Appl. No.: 18/439,802

(22) Filed: Feb. 13, 2024

(65) Prior Publication Data

US 2025/0257773 A1 Aug. 14, 2025

(51) Int. Cl.

| | |
|---|---|
| ***C22C 21/00*** | (2006.01) |
| ***C22C 23/02*** | (2006.01) |
| ***F16D 65/12*** | (2006.01) |
| ***F16D 69/02*** | (2006.01) |
| *F16D 65/02* | (2006.01) |

(52) U.S. Cl.

CPC ......... *F16D 65/125* (2013.01); *F16D 65/127* (2013.01); *F16D 65/128* (2013.01); *F16D 69/027* (2013.01); *C22C 21/00* (2013.01); *C22C 23/02* (2013.01); *F16D 2065/132* (2013.01); *F16D 2200/0008* (2013.01); *F16D 2200/003* (2013.01); *F16D 2250/0007* (2013.01); *F16D 2250/0046* (2013.01)

(58) Field of Classification Search

None

See application file for complete search history.

(56) References Cited

U.S. PATENT DOCUMENTS 5,407,035 A * 4/1995 Cole ..................... F16D 65/127 188/218 XL
5,901,818 A * 5/1999 Martino .................. F16D 69/02 188/218 XL
10,040,094 B2 * 8/2018 Lazur ...................... C04B 41/50

(Continued)

FOREIGN PATENT DOCUMENTS

CN 103131992 A * 6/2013
CN 111299597 A * 6/2020 ............. B22F 1/145

(Continued)

OTHER PUBLICATIONS

CN 103131992 A Machine Translation (No Date).*

(Continued)

*Primary Examiner* — Robert A. Siconolfi
*Assistant Examiner* — Shea Woodrow Irvin
(74) *Attorney, Agent, or Firm* — Quinn IP Law

(57) ABSTRACT

A brake rotor for a motor vehicle having a composite structure may include an annular body defining opposite friction surfaces of the brake rotor. The annular body may include a core made of a lightweight, magnesium-based alloy; a thermal barrier layer made of a thermally insulating material disposed on the core; and a wear-resistant layer made of an Al—Fe—Si—Zr alloy of aluminum (Al)+iron (Fe)+silicon (Si)+zirconium (Zr) that is disposed on the core over the thermal barrier layer. The wear-resistant layer may define a first one of the opposite friction surfaces of the annular body.

20 Claims, 3 Drawing Sheets

(56) References Cited

U.S. PATENT DOCUMENTS

| | | | | |
|---|---|---|---|---|
| 2019/0352748 | A1* | 11/2019 | Liu | C21D 6/008 |
| 2021/0140017 | A1* | 5/2021 | Park | C22C 1/02 |

FOREIGN PATENT DOCUMENTS

| | | | | | |
|---|---|---|---|---|---|
| CN | 113007241 | A | * | 6/2021 | F16D 69/027 |
| DE | 29603468 | | | 5/1996 | |
| DE | 10315112 | A1 | * | 10/2004 | C22C 32/0068 |
| DE | 10352453 | A1 | | 6/2005 | |
| DE | 102009003161 | A1 | * | 11/2010 | C23C 4/129 |
| DE | 102018123637 | A1 | | 3/2019 | |
| DE | 102023100295 | A1 | | 1/2024 | |

OTHER PUBLICATIONS

CN 111299597 A Machine Translation (No Date).*
CN 113007241 A Machine Translation (No Date).*
DE 10315112 A1 Machine Translation (No Date).*
DE102009003161 A1 Machine Translation (No Date).*
Metco 205 Data Sheet (No Date), Not relied upon for Rejection.*
AZ61 Material Properties, Wayback machine screenshot dated Apr. 20, 2026, not relied upon for rejection. (Year: 2026).*

* cited by examiner

LIGHTWEIGHT MAGNESIUM-BASED COMPOSITE BRAKE ROTOR

INTRODUCTION

The present disclosure generally relates to brake rotors and, more particularly, to composite brake rotors made of lightweight magnesium-based alloys.

Disc brake assemblies of motor vehicles include a disc or rotor with a pair of annular friction surfaces on opposite sides thereof. The rotor may be mounted on a rotatable axle of the vehicle, which may be coupled to a wheel of the motor vehicle. During braking, an outer periphery of the rotor is clamped between a pair of opposing brake pads, which engage the friction surfaces of the rotor and slow or stop rotation of the rotor and the wheel. Brake rotors of motor vehicles are oftentimes made of cast iron, which can withstand the high friction forces and high temperatures generated during braking.

SUMMARY

This section provides a general summary of the disclosure and is not a comprehensive disclosure of its full scope or all of its features.

It is recognized herein that it may be desirable to manufacture the above-summarized brake rotors of motor vehicles from relatively lightweight magnesium alloys, e.g., to decrease the weight of the vehicles. It may be desirable to develop a magnesium-based alloy brake rotor for a motor vehicle that exhibits wear-resistance and thermal stability at least as high as that of cast iron.

To that end, the present disclosure relates to a brake rotor for a motor vehicle having a composite structure. The brake rotor comprises an annular body defining opposite friction surfaces. The annular body comprises a core, a thermal barrier layer, and a wear-resistant layer. The core is made of a magnesium-based alloy (e.g., an alloy of magnesium (Mg)+aluminum (Al)+zinc (Zn) (i.e., Mg—Al—Zn)) and includes at least one annular disc having an annular surface. The thermal barrier layer is made of a thermally insulating material and is disposed on the annular surface of the core. The wear-resistant layer is disposed on the annular surface of the core over the thermal barrier layer. The wear-resistant layer defines a first one of the opposite friction surfaces of the annular body and may be made of an alloy of aluminum (Al)+iron (Fe)+silicon (Si)+zirconium (Zr) (i.e., Al—Fe—Si—Zr).

In some examples, the magnesium-based alloy may be a Mg—Al—Zn alloy, such as AZ31, AZ61, or AZ91. The magnesium-based alloy may comprise, by mass, about 93% Mg, about 6% Al, and about 1% Zn. In terms of weight percentage, the magnesium-based alloy can comprise about 3.8-5.0 wt. % aluminum, about 0.8-1.5 wt. % zinc, about 0.3-0.7 wt. % manganese, and balance magnesium. Alternatively, the magnesium-based alloy may comprise a composite material comprising Mg—Al—Zn alloy and Boron Nitride (BN) and/or Boron Carbide ($B_2C$).

The core material may have a density of greater than or equal to about 1.7 g/cm$^3$ to less than or equal to about 1.9 g/cm$^3$, a thermal conductivity from about 90 W/m-K to about 100 W/m-K; and a thickness of greater than or equal to about 9 mm to less than or equal to about 36 mm.

In some examples, the thermally insulating material may comprise a high entropy alloy, a high entropy ceramic, or a combination thereof. The thermally insulating material may have a thermal conductivity of greater than or equal to about 0.4 watts per meter-kelvin to less than or equal to 2 W/m-K.

In some examples, the wear-resistant layer may comprise an Al—Fe—Si—Zr alloy. The Al—Fe—Si—Zr alloy can comprise $Al_{50}Fe_{42}Si_6Zr_2$. The Al—Fe—Si—Zr alloy may have a density of greater than or equal to about 4,800 kilograms per cubic meter to less than or equal to about 5,200 kilograms per cubic meter.

In other examples, an Al—Fe—Si—Zr wear-resistant alloy may optionally comprise a grain refiner in an amount, by mass, greater than or equal to about 0.05% to less than or equal to about 1% of the Al—Fe—Si—Zr alloy. The grain refiner may comprise at least one of chromium (III) boride and tantalum boride.

In some examples, the thermal barrier layer may have a thickness of greater than or equal to about 0.05 mm to less than or equal to about 4 mm. The wear-resistant layer may have a thickness of greater than or equal to about 1 mm to less than or equal to about 4 mm.

In some examples, the thermal barrier layer may be perforated and may include a plurality of through-holes extending in an axial direction therethrough. The wear-resistant layer may include a plurality of anchors that extend from an outer surface of the thermal barrier layer into the plurality of through-holes toward the core. The plurality of anchors may extend from the outer surface of the thermal barrier layer into the plurality of through-holes to the annular surface of the core. In such case, the Al—Fe—Si—Zr alloy of the wear-resistant layer may be metallurgically bonded to the magnesium-based alloy of the core via the plurality of anchors.

In some examples, the core may comprise a pair of first and second annular discs spaced apart from each other in an axial direction by a plurality of ribs.

The present disclosure relates to another brake rotor for a motor vehicle comprising an annular body that defines opposite first and second friction surfaces of the brake rotor. In some examples, the annular body comprises a core, first and second thermal barrier layers, and first and second wear-resistant layers. The core is made of a magnesium-based alloy and includes a pair of first and second annular discs spaced apart from each other in an axial direction by a plurality of ribs, with each of the first and second annular discs having an annular surface. The first and second thermal barrier layers are made of a thermally insulating material and are respectively disposed on the annular surfaces of the first and second annular discs of the core. The first and second wear-resistant layers may be made of an Al—Fe—Si—Zr alloy and are respectively disposed on the annular surfaces of the first and second annular discs over the first and second thermal barrier layers. The first and second wear-resistant layers respectively define the opposite first and second friction surfaces of the annular body.

A method of manufacturing a brake rotor for a motor vehicle is disclosed. In some examples, the magnesium-based alloy is cast into a shape of a rotor core that includes at least one annular disc having an annular surface. A thermally insulating material is deposited directly on the annular surface of the rotor core to form a thermal barrier layer. An Al—Fe—Si—Zr alloy may be deposited on the annular surface of the rotor core over the thermal barrier layer to form a wear-resistant layer.

In some examples, the thermally insulating material and the Al—Fe—Si—Zr alloy may be deposited on the annular surface of the rotor core using a directed energy deposition process. The thermally insulating material may be deposited on the annular surface of the rotor core such that the thermal barrier layer is perforated and includes a plurality of through-holes extending in an axial direction therethrough. During deposition of the Al—Fe—Si—Zr alloy on the annular surface of the rotor core, the Al—Fe—Si—Zr alloy may flow into and through the through-holes in the thermal barrier layer and form a plurality of anchors that metallurgically bond the Al—Fe—Si—Zr alloy of the wear-resistant layer to the magnesium-based alloy of the core.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
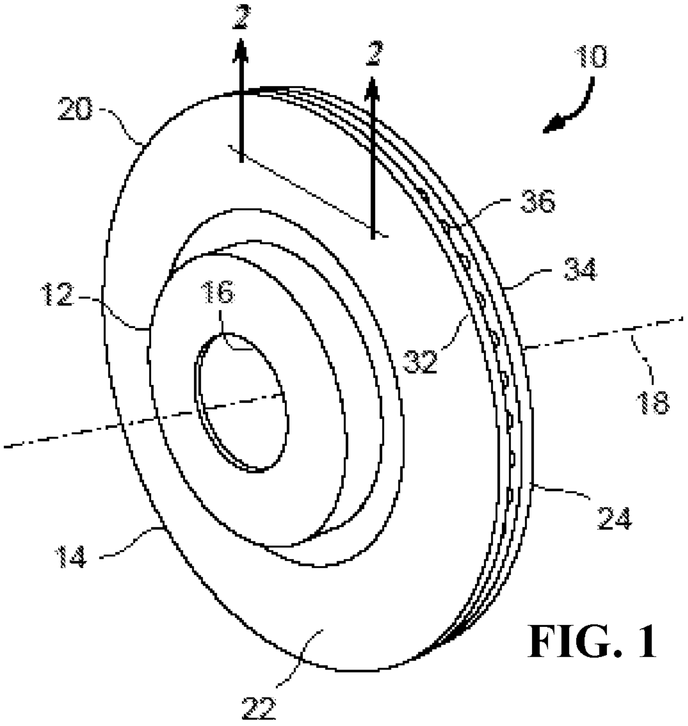
FIG. 1 is a perspective view of a brake rotor for a disc brake assembly of a motor vehicle, wherein the brake rotor includes a hub and an annular body.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

As used herein, the term "metal" may refer to a pure elemental metal or to an alloy of an elemental metal and one or more other metal or nonmetal elements (referred to as "alloying" elements). The alloying elements may be selected to impart certain desirable properties to the alloy that are not exhibited by the base metal element. Alloys described herein may be represented by a sequence of chemical symbols for the base element (e.g., Mg) and its major alloying elements (e.g., Al and Zn), with the alloying elements arranged in order of decreasing mass percent (or alphabetically if percentages are similar or equal), e.g., an Mg—Al—Zn alloy. Sometimes a number may precede the chemical symbol for one or more of the alloying elements. In such case, the number preceding the chemical symbol for the alloying element represents the average mass percent of that element in the alloy composition, unless otherwise specified.

Example embodiments will now be described more fully with reference to the accompanying drawings.

The presently disclosed brake rotor for a motor vehicle comprises a composite structure that allows the brake rotor to be relatively lightweight, while also exhibiting exceptional wear resistance and thermal stability. The brake rotor has an annular body with first and second friction surfaces disposed on opposite sides thereof. The annular body comprises a core made of a relatively light weight magnesium-based alloy and first and second wear-resistant layers respectively disposed on the first and second friction surfaces of the annular body. The first and second wear-resistant layers may be made of an Al—Fe—Si—Zr alloy that is relatively hard and dense, as compared to the magnesium-based alloy of the core. First and second thermal barrier layers are respectively sandwiched between the first friction surface and the first wear-resistant layer and between the second friction surface and the second wear-resistant layer. The first and second thermal barrier layers thermally insulate the magnesium-based alloy of the core from the relatively high temperatures generated in the first and second wear-resistant layers during braking. For example, the first and second thermal barrier layers disposed on opposite sides of the magnesium-based alloy of the core may help maintain the core at a temperature of less than about 350 degrees Celsius (° C.), even in situations where the temperature of the first and second wear-resistant layers is greater than about 550° C. The magnesium-based alloy may comprise a Mg—Al—Zn alloy.

FIG. 1 depicts a brake rotor 10 for a disc brake assembly of a motor vehicle (not shown). The brake rotor 10 includes a hub 12, an annular body 14, and a central opening 16 that defines an axis of rotation 18 of the brake rotor 10. The hub 12 may be configured to mount the brake rotor 10 to a rotatable axle of the motor vehicle. The annular body 14 extends in a radial direction from the central opening 16 and defines an outer periphery 20 of the brake rotor 10 and first and second friction surfaces 22, 24 disposed on opposite sides of the brake rotor 10. The first and second friction surfaces 22, 24 are configured to engage with brake pads (not shown) disposed on opposite sides of the brake rotor 10 to generate frictional forces that oppose rotation of the brake rotor 10 during braking.

The presently disclosed brake rotor 10 may exhibit other configurations, as will be appreciated by persons of ordinary skill in the art. For example, in some aspects, the hub 12 may be omitted and the brake rotor 10 may be coupled to a rotatable axle of a motor vehicle by other means.

Figure 2:
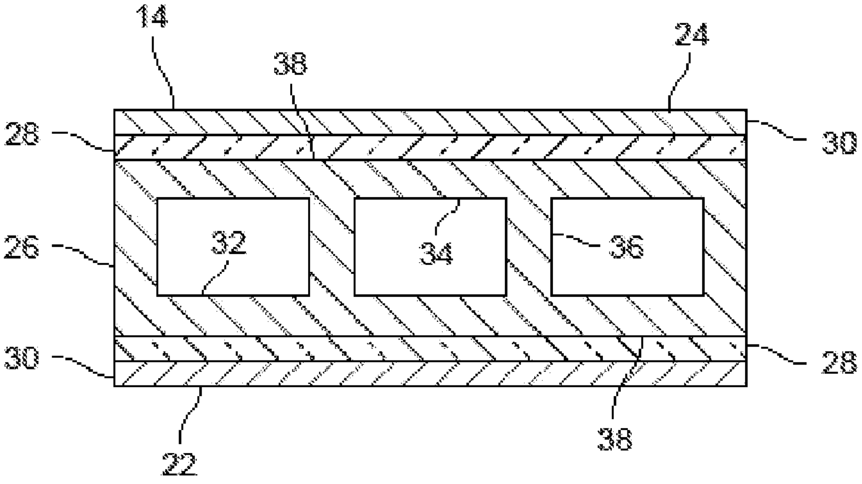
FIG. 2 is schematic cross-sectional view of the annular body of FIG. 1 taken along line 2-2 of FIG. 1, wherein the annular body includes a core, first and second thermal barrier layers disposed on the core, and first and second wear-resistant layers disposed on the core over the first and second thermal barrier layers.

Referring now to FIG. 2, the annular body 14 exhibits a composite structure comprising a core 26, first and second thermal barrier layers 28, and first and second wear-resistant layers 30. The core 26 includes at least one annular disc 32 or 34 that defines a pair of annular surfaces 38 disposed on opposite sides of the brake rotor 10 and facing away from the core 26. The core 26 depicted in FIG. 2 includes a pair of first and second annular discs 32, 34 disposed on opposite sides of the brake rotor 10 and spaced apart from each other in an axial direction 18 by a plurality of ribs 36. Each of the first and second annular discs 32, 34 has an annular surface 38 that faces away from the core 26. The core 26 may have a thickness, measured between the opposite annular surfaces 38, of greater than or equal to about 9 mm to less than or equal to about 36 mm. The core 26 may comprise a monolithic, one-piece construction.

Core 26 may be made of a magnesium-based alloy, comprising, for example, by mass, 93% Mg, 6% Al, and 1% Zn (i.e., AZ61 alloy). Alternatively, alloys AZ31 or AZ91 may be used, wherein alloy AZ31 comprises 97% Mg, 2.5-3.5% Al, and 0.5-1.5% Zn; and alloy AZ91 comprises 90% Mg, 9% Al, and 1% Zn.

The first and second thermal barrier layers 28 are respectively disposed on the opposite annular surfaces 38 of the core 26 and are configured to inhibit heat transfer from the first and second friction surfaces 22, 24 of the brake rotor 10 to the core 26 during braking. In some aspects, the first and second thermal barrier layers 28 may be deposited directly on the opposite annular surfaces 38 of the core 26. The thermal barrier layers 28 may help maintain the core 26 at a temperature of less than about 350° C., even in situations where the temperature of the first and second wear-resistant layers 30 is greater than about 550° C. Each of the first and second thermal barrier layers 28 may have a thickness, measured from the annular surface 38 of the core 26, of greater than or equal to about 0.05 mm to less than or equal to about 2 m or less than or equal to about 4 m. The thermal barrier layers 28 may be substantially coextensive with the annular surfaces 38 of the core 26.

The first and second thermal barrier layers 28 may be made of a thermally insulating material having a relatively low thermal conductivity, as compared to the thermal conductivity of the core 26 and the first and second wear-resistant layers 30. For example, the thermal conductivity of the thermally insulating material may be about 5-20% of that of the wear-resistant layers 30. The thermal conductivity of the thermally insulating material may be greater than or equal to about 0.4 W/m-K or about 0.5 W/m-K to less than or equal to 0.7 W/m-K or less than or equal to about 2 W/m-K. The thermally insulating material may have a density of about 1.46 g/cm$^3$ and a specific heat of about 1.5 J/g-K.

The thermally insulating material of the thermal barrier layers 28 may comprise a high entropy alloy, a high entropy ceramic, or a combination thereof. A high entropy alloy or ceramic material is an inorganic alloy or ceramic material that (a) comprises at least four elements, with each element being present in the alloy or ceramic at a concentration, on an atomic basis, of greater than or equal to about 5% to less than or equal to about 35%, and/or (b) exists in the form of a solid solution with no intermetallic phases. Examples of high entropy alloys include bismuth (Bi) and tellurium (Te) (i.e., Bi—Te)-based materials, and bismuth (Bi), antimony (Sb), tellurium (Te), and selenium (Se) (i.e., Bi—Sb—Te—Se)-based materials, e.g., $BiSbTe_{1.5}Se_{1.5}$ and/or $(BiSbTe_{1.5}Se_{1.5})_{1-x}Ag_x$, where x is about 0.9 atomic percent and Ag is silver. Examples of high entropy ceramics include zirconate ($Zr_xO_y^{-2}$)-based materials and rare earth metal zirconate ($R_2Zr_2O_7$)-based materials, where R may be $La_2O_3$, $Nd_2O_3$, $Sm_2O_3$, $Eu_2O_3$, $Gd_2O_3$, and/or $Y_2O_3$; and where Zr=zirconium, La=lanthanum, Nd=neodymium, Sm=samarium, Eu=europium, Gd=gadolinium, Y=yttrium, and O=oxygen.

The first and second wear-resistant layers 30 are respectively disposed on the first and second thermal barrier layers 28 and respectively define the first and second friction surfaces 22, 24 of the brake rotor 10. In some aspects, the first and second wear-resistant layers 30 may be directly deposited on the first and second thermal barrier layers 28, respectively. The first and second wear-resistant layers 30 are configured to provide the first and second friction surfaces 22, 24 of the brake rotor 10 with high wear-resistance and excellent thermal stability. For example, the first and second wear-resistant layers 30 may be formulated to exhibit exceptional mechanical stability at high temperatures, e.g., at temperatures of up to about 1,300° C. Each of the first and second wear-resistant layers 30 may have a thickness, measured from the surface of the adjacent thermal barrier layer 28, of greater than or equal to about 1 mm to less than or equal to about 2 mm or less than or equal to about 4 mm. The wear-resistant layers 30 may be substantially coextensive with the thermal barrier layers 28 and the annular surfaces 38 of the core 26.

The first and second wear-resistant layers 30 may be made of an aluminum alloy comprising, in addition to aluminum (Al), alloying elements of iron (Fe), silicon (Si), and zirconium (Zr), and thus may be referred to as an Al—Fe—Si—Zr alloy. The amount of iron, silicon, and zirconium in the aluminum alloy are selected to provide the Al—Fe—Si—Zr alloy with high strength, exceptional wear resistance, oxidation resistance, and corrosion resistance. In the Al—Fe—Si—Zr alloy, the aluminum, iron, silicon, and zirconium may be present in the form of AlFeSiZr-containing intermetallic particles. The Al—Fe—Si—Zr alloy may comprise $Al_{50}Fe_{42}Si_6Zr_2$.

In some aspects, the Al—Fe—Si—Zr alloy may comprise a grain refiner. Examples of grain refiners include boride compounds, e.g., chromium (III) boride (CrB) and/or tantalum boride (e.g., TaB and/or $TaB_2$). In aspects where the grain refiner comprises chromium (III) boride and tantalum boride, the mass ratio of chromium (III) boride to tantalum boride in the Al—Fe—Si—Zr alloy may be about 1:1. The grain refiner may be present in the Al—Fe—Si—Zr alloy in an amount, by mass, greater than or equal to about 0.05% to less than or equal to about 1% of the Al—Fe—Si—Zr alloy.

The Al—Fe—Si—Zr alloy may exhibit a relatively high density, as compared to the density of the magnesium-based alloy and/or the thermally insulating material. For example, the Al—Fe—Si—Zr alloy has a density of greater than or equal to about 4.8 g/cm$^3$ to less than or equal to about 5.2 g/cm$^3$. In one example, the Al—Fe—Si—Zr alloy may have a density of about 4.99 g/cm$^3$. The Al—Fe—Si—Zr alloy may have a thermal conductivity of greater than or equal to about 11 W/m-K to less than or equal to about 13 W/m-K and a specific heat of greater than or equal to about 0.61 J/k-K to less than or equal to about 0.67 J/g-K.

Additional elements not intentionally introduced into the composition of the presently disclosed Mg—Al—Zn alloy and/or the Al—Fe—Si—Zr alloy nonetheless may be inherently present in the alloys in relatively small amounts, for example, in individual and/or cumulative amounts, by mass, less than or equal to about 0.1%, optionally less than or equal to about 0.05%, or optionally less than or equal to about 0.01% of the alloys. Such elements may be present, for example, as impurities in the raw or scrap materials used to prepare the alloys. In embodiments where the alloys are referred to as including one or more alloying elements (e.g., Si) and aluminum or iron as balance, the term "as balance" does not exclude the presence of additional elements not intentionally introduced into the composition of the alloys but nonetheless inherently present in the alloys in relatively small amounts, e.g., as impurities.

Figure 3:
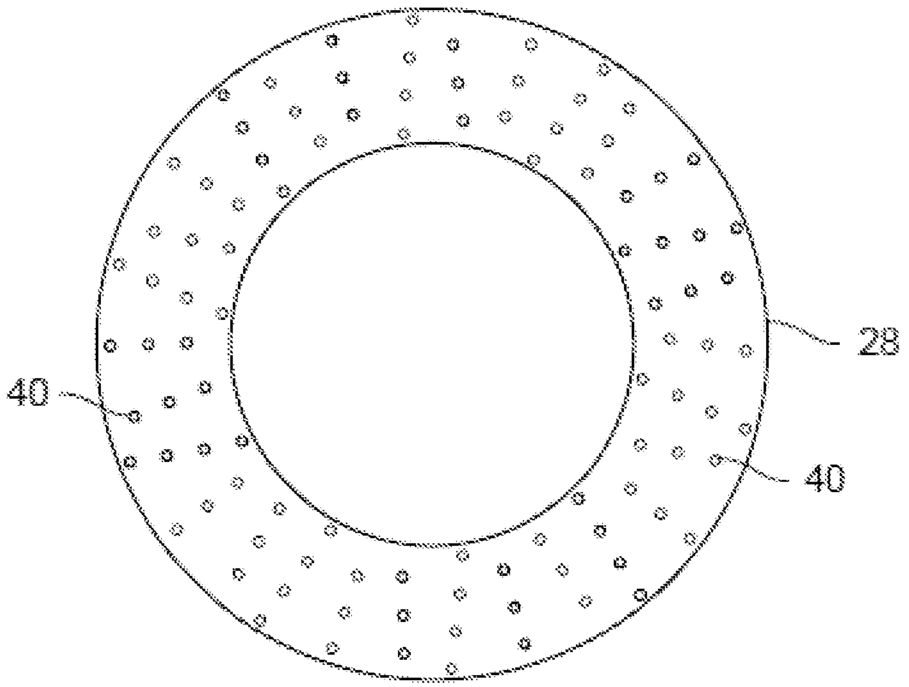
FIG. 3 is schematic cross-sectional view of a thermal barrier layer having a perforated structure and including a plurality of through-holes extending therethrough.
Figure 4:
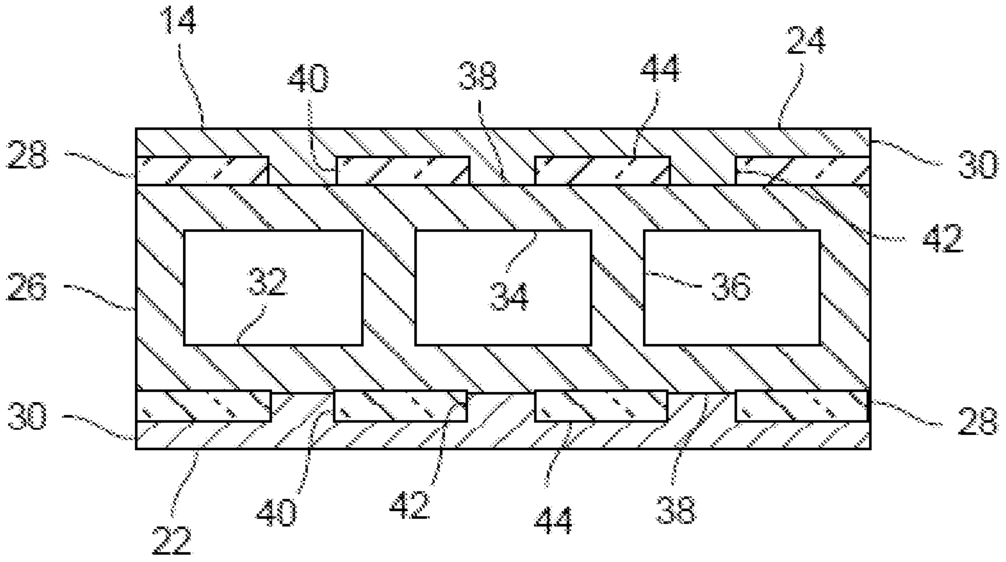
FIG. 4 is schematic cross-sectional view of an annular body of a brake rotor, wherein the annular body includes a core, perforated first and second thermal barrier layers disposed on the core, and first and second wear-resistant layers disposed on the core over the first and second thermal barrier layers, and wherein the first and second wear-resistant layers each include a plurality of anchors that respectively extend from outer surfaces of the first and second thermal barrier layers into the plurality of through-holes in the perforated first and second thermal barrier layers to the core.

Referring now to FIG. 3, in some aspects, the first and second thermal barrier layers 28 may be perforated. The thermal barrier layers 28 may include a plurality of through-holes 40 extending in an axial direction through the thermal barrier layers 28. In aspects, the through-holes 40 may extend entirely through the thermal barrier layers 28 to the core 26. In such case, as shown in FIG. 4, the first and second wear-resistant layers 30 may each include a plurality of anchors 42 that respectively extend from an outer surface 44 of the first and second thermal barrier layers 28 into the plurality of through-holes 40 in the thermal barrier layers 28 to the annular surfaces 38 of the core 26. In such case, the Al—Fe—Si—Zr alloy of the wear-resistant layers 30 may be metallurgically bonded to the magnesium-based alloy of the core 26 via the plurality of anchors 42.

An example of a method of manufacturing the brake rotor 10 for a motor vehicle may include one or more of the following steps. In a first step, the magnesium-based alloy may be cast into the shape of the core 26. In a second step, the thermally insulating material may be deposited directly on the annular surfaces 38 of the core 26 to form the first and second thermal barrier layers 28. In some aspects, the thermally insulating material may be selectively deposited on the annular surfaces 38 of the core 26 in a predefined pattern, for example, such that the resulting first and second thermal barrier layers 28 are perforated and include the plurality of through-holes 40. In a third step, the wear-resistant alloy (e.g., Al—Fe—Si—Zr) may be deposited on the annular surfaces of the core 26 over the first and second thermal barrier layers 28 to form the first and second wear-resistant layers 30. In aspects where the first and second thermal barrier layers 28 are perforated, the wear-resistant alloy may flow into the plurality of through-holes 40 and form the plurality of anchors 42, which may metallurgically bond with the annular surfaces 38 of the core 26.

Figure 5:
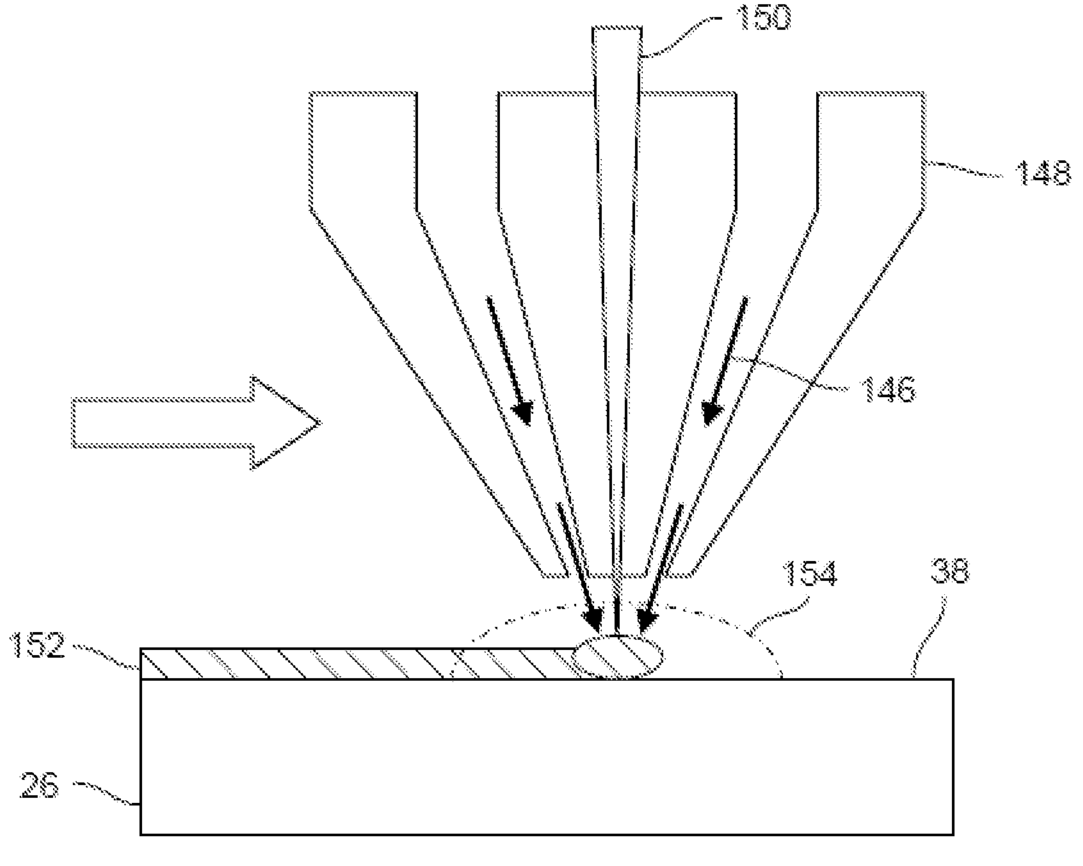
FIG. 5 is a schematic cross-sectional view of an apparatus for depositing the first and second thermal barrier layers and the first and second wear-resistant layers on the core of the annular body of FIGS. 2 and 4.

Referring now to FIG. 5, in some aspects, the thermally insulating material and the wear-resistant alloy may be respectively and sequentially deposited on the annular surfaces 38 of the core 26 using directed energy deposition processes. During the directed energy deposition processes, a feedstock material 146 is deposited by a nozzle 148 on the annular surface 38 of the core 26 and simultaneously melted by application of a focused energy source 150 thereto. The nozzle 148 and focused energy source 150 are advanced along the annular surface 38 of the core 26 in a predefined pattern, leaving behind a layer of solidified feedstock material 152. The focused energy source may be a plasma arc, electron beam, or laser, or combinations thereof. A shielding gas may be applied to a region 154 surrounding the deposition site to prevent or inhibit undesired side reactions. The feedstock material may be in the form of a wire or a powder and may exhibit substantially the same composition as the layer being formed. For example, during formation of the first and second thermal barrier layers 28, the feedstock material 152 may have substantially the same composition as that of the thermally insulating material. Likewise, during formation of the first and second wear-resistant layers 30, the feedstock material 152 may have substantially the same composition as that of the exemplary Al—Fe—Si—Zr alloy.

The composite brake rotor 10 can further comprise a thin, adhesion-strengthening interlayer disposed in-between the core 26 and the thermal barrier layers 28 comprising a metal or metal alloy selected from Ti (titanium), Cr (chromium), Mo (molybdenum), W (tungsten), Nb (niobium), Ta (tantalum), or combinations thereof. The interlayer may be 0.05-0.5 mm thick, and may be deposited by Physical Vapor Deposition (PVD), sputtering, etc.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for given embodiments reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," additional compositions, materials, components, elements, ingredients, features, integers, operations, and/or process steps that materially affect the basic and novel characteristics are excluded from such an embodiment, but compositions, materials, components, elements, ingredients, features, integers, operations, and/or process steps that do not materially affect the basic and novel characteristics can be included in the embodiment.

Method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least some chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight.

The foregoing description of the embodiments has been provided for purposes of illustration and description. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A brake rotor for a motor vehicle, the brake rotor comprising:

an annular body defining a first friction surface, the annular body comprising:

a core comprising a magnesium-based alloy and including at least one annular disc having an annular surface;

a thermal barrier layer comprising a thermally insulating material disposed on the annular surface of the core; and a wear-resistant Al—Fe—Si—Zr alloy layer comprising aluminum (Al)+iron (Fe)+silicon (Si)+zirconium (Zr) disposed on the annular surface of the core over the thermal barrier layer;

wherein the wear-resistant layer defines the first friction surface of the annular body; and wherein the Al—Fe—Si—Zr alloy comprises $Al_{50}Fe_{42}Si_6Zr_2$.

2. The brake rotor of claim 1, wherein the magnesium-based alloy comprises, by mass, about 93% magnesium (Mg), about 6% aluminum (Al), and about 1% zinc (Zn).

3. The brake rotor of claim 1, wherein the magnesium-based alloy comprises about 3.8-5.0 wt. % aluminum, about 0.8-1.5 wt. % zinc, about 0.3-0.7 wt. % manganese, and balance magnesium.

4. The brake rotor of claim 1, wherein the magnesium-based alloy comprises a composite material comprising Mg—Al—Zn alloy and Boron Nitride (BN) and/or Boron Carbide ($B_2C$).

5. The brake rotor of claim 1, further comprising an adhesion-strengthening interlayer disposed in-between the core and the thermal barrier layer comprising a metal or metal alloy selected from Ti (titanium), Cr (chromium), Mo (molybdenum), W (tungsten), Nb (niobium), or Ta (tantalum), or combinations thereof.

6. The brake rotor of claim 1, wherein the core has a density between about 1.7 $g/cm^3$ to about 1.9 $g/cm^3$;

a thermal conductivity between about 90 W/m-K to about 100 W/m-K;

a tensile strength between about 260 MPa to about 280 MPa; and a thickness of greater than or equal to about 9 mm to less than or equal to about 36 mm.

7. The brake rotor of claim 1, wherein the thermally insulating material comprises a high entropy alloy, a high entropy ceramic, or a combination thereof.

8. The brake rotor of claim 1, wherein the thermally insulating material has a thermal conductivity of greater than or equal to about 0.4 W/m-K to less than or equal to 2 W/m-K.

9. The brake rotor of claim 1, wherein the Al—Fe—Si—Zr alloy comprises a grain refiner in an amount, by mass, greater than or equal to about 0.05% to less than or equal to about 1% of the Al—Fe—Si—Zr alloy, and wherein the grain refiner comprises at least one of chromium (III) boride and tantalum boride.

10. The brake rotor of claim 1, wherein the thermal barrier layer has a thickness of greater than or equal to about 0.05 mm to less than or equal to about 4 mm.

11. The brake rotor of claim 1, wherein the wear-resistant layer has a thickness of greater than or equal to about 1 mm to less than or equal to about 4 mm.

12. The brake rotor of claim 1, wherein the thermal barrier layer is perforated and includes a plurality of through-holes extending in an axial direction therethrough.

13. A brake rotor for a motor vehicle, the brake rotor comprising:

an annular body defining a first friction surface, the annular body comprising:

a core comprising a magnesium-based alloy and including at least one annular disc having an annular surface;

a thermal barrier layer comprising a thermally insulating material disposed on the annular surface of the core; and a wear-resistant Al—Fe—Si—Zr alloy layer comprising aluminum (Al)+iron (Fe)+silicon (Si)+zirconium (Zr) disposed on the annular surface of the core over the thermal barrier layer;

wherein the wear-resistant layer defines the first friction surface of the annular body;

wherein the thermal barrier layer is perforated and includes a plurality of through-holes extending in an axial direction therethrough; and wherein the wear-resistant layer includes a plurality of anchors that extend from an outer surface of the thermal barrier layer into the plurality of through-holes toward the core.

14. The brake rotor of claim 13, wherein the plurality of anchors extends from the outer surface of the thermal barrier layer into the plurality of through-holes to the annular surface of the core, and wherein the wear-resistant Al—Fe—Si—Zr alloy layer is metallurgically bonded to the magnesium-based alloy of the core via the plurality of anchors.

15. The brake rotor of claim 1, wherein the core comprises a pair of first and second annular discs spaced apart from each other in an axial direction by a plurality of ribs.

16. A method of manufacturing a brake rotor for a motor vehicle, the method comprising:

casting a magnesium-based alloy into a shape of a rotor core including at least one annular disc having an annular surface;

depositing a thermally insulating material directly on the annular surface of the rotor core to form a thermal barrier layer;

depositing a wear-resistant Al—Fe—Si—Zr alloy layer comprising aluminum (Al)+iron (Fe)+silicon (Si)+zirconium (Zr) on the annular surface of the rotor core over the thermal barrier layer to form a wear-resistant layer; and wherein the Al—Fe—Si—Zr alloy comprises $Al_{50}Fe_{42}Si_6Zr_2$.

17. The method of claim 16, wherein the thermally insulating material and the wear-resistant Al—Fe—Si—Zr alloy layer are deposited on the annular surface of the rotor core using a directed energy deposition process.

18. The method of claim 16, wherein the thermally insulating material is deposited on the annular surface of the rotor core such that the thermal barrier layer is perforated and includes a plurality of through-holes extending in an axial direction therethrough.

19. The brake rotor of claim 13, further comprising an adhesion-strengthening interlayer disposed in-between the core and the thermal barrier layer, comprising a metal or metal alloy selected from Ti (titanium), Cr (chromium), Mo (molybdenum), W (tungsten), Nb (niobium), or Ta (tantalum), or combinations thereof.

20. The brake rotor of claim 16, further comprising an adhesion-strengthening interlayer disposed in-between the core and the thermal barrier layer, comprising a metal or metal alloy selected from Ti (titanium), Cr (chromium), Mo (molybdenum), W (tungsten), Nb (niobium), or Ta (tantalum), or combinations thereof.

* * * * *